(12) United States Patent
Kobayashi et al.

(10) Patent No.: US 7,280,457 B2
(45) Date of Patent: Oct. 9, 2007

(54) OPTICAL DISC WITH AN IMPROVED COMPOUND LENS

(75) Inventors: Takashi Kobayashi, Kanagawa (JP); Tadashi Taniguchi, Kanagawa (JP)

(73) Assignee: Sony Corporation (JP)

( * ) Notice: Subject to any disclaimer, the term of this patent is extended or adjusted under 35 U.S.C. 154(b) by 517 days.

(21) Appl. No.: 10/473,722

(22) PCT Filed: Feb. 20, 2003

(86) PCT No.: PCT/JP03/01887

§ 371 (c)(1),
(2), (4) Date: Oct. 1, 2003

(87) PCT Pub. No.: WO03/071529

PCT Pub. Date: Aug. 28, 2003

(65) Prior Publication Data

US 2004/0095870 A1 May 20, 2004

(30) Foreign Application Priority Data

Feb. 25, 2002 (JP) .............................. 2002-048011

(51) Int. Cl.
*G11B 7/136* (2006.01)
(52) U.S. Cl. ...................... 369/112.09; 369/112.05; 369/44.12
(58) Field of Classification Search ............ 369/44.17, 369/44.14, 44.11–12, 112.09, 112.08, 112.05
See application file for complete search history.

(56) References Cited

U.S. PATENT DOCUMENTS

| | | | | |
|---|---|---|---|---|
| 4,571,715 A | * | 2/1986 | Kato et al. ............... | 369/44.16 |
| 4,823,335 A | * | 4/1989 | Shikama et al. ....... | 369/112.09 |
| 5,402,407 A | * | 3/1995 | Eguchi et al. ......... | 369/112.29 |
| 5,410,529 A | * | 4/1995 | Kurata et al. .......... | 369/112.12 |
| 5,450,237 A | * | 9/1995 | Yoshida et al. ............. | 359/562 |
| 5,623,466 A | * | 4/1997 | Itonaga .................... | 369/44.32 |
| 5,665,957 A | * | 9/1997 | Lee et al. ................ | 369/53.23 |
| 5,671,207 A | * | 9/1997 | Park ........................ | 369/44.23 |
| 6,940,789 B2 | * | 9/2005 | Nishi ...................... | 369/44.42 |
| 2001/0036018 A1 | * | 11/2001 | Arai ........................... | 359/642 |

FOREIGN PATENT DOCUMENTS

| | | |
|---|---|---|
| JP | 2-46535 A1 | 2/1990 |
| JP | 9-44893 A1 | 2/1997 |
| JP | 11-110782 A1 | 4/1999 |
| JP | 2002-341113 A1 | 11/2002 |

\* cited by examiner

*Primary Examiner*—Thang V. Tran
*Assistant Examiner*—LaTanya Bibbins
(74) *Attorney, Agent, or Firm*—Rader Fishman & Grauer PLLC; Ronald P. Kananen

(57) ABSTRACT

The present invention relates to an optical pickup and a disc drive for preventing aberrations of laser light due to variations in temperature and humidity to ensure satisfactory characteristics of the laser light. A compound lens (14) is disposed in the optical path of the laser light, which is emitted by a light-emitting device (11) to be incident on a beam splitter (15), and in the optical path of the laser light, which exits from the beam splitter to be incident on a photodetector (13). The compound lens includes a diffractive section (23) for diffracting the laser light and a lens section (24) having a predetermined function for the laser light. The compound lens is formed by integrating individual sections including the diffractive section and the lens section. The compound lens is provided with a passage hole (14c) that lets in the laser light emitted by the light-emitting device to be incident on the beam splitter.

4 Claims, 6 Drawing Sheets

OPTICAL DISC WITH AN IMPROVED COMPOUND LENS

TECHNICAL FIELD

The present invention relates to the technical field of optical pickups and disc drives. Specifically, the present invention relates to the technical field of an optical pickup for recording and/or playing back information signals on a disc recording medium loaded on a disc table, and to the technical field of a disc drive including this optical pickup.

BACKGROUND ART

Disc drives for recording and/or playing back information signals on a disc recording medium are known. Such disc drives have an optical pickup that moves in the radial direction of the disc recording medium, which is loaded on a disc table, to irradiate the disc recording medium with laser light.

The optical pickup has a movable base that moves in the radial direction of the disc recording medium. The movable base includes, for example, predetermined optical components (optical elements and parts). Some optical pickups include a compound lens having several functions for the laser light emitted by a light-emitting device.

Each optical component disposed on the movable base and the optical path of the laser light in a conventional optical pickup including the compound lens will now be described (see FIG. 6).

In the optical pickup, a mounting plate a is disposed on the movable base, which is not shown in the drawing.

This mounting plate a is a thin box having an opening. The mounting plate a has a metal lead frame, not shown in the drawing, for electrically connecting the optical pickup to the outside.

The mounting plate a holds a light-emitting device b. A mounting block c, referred to as a submount, separates the mounting plate a and the light-emitting device b. The light-emitting device b is an edge-emitting device, which emits laser light in the lateral direction.

The mounting plate a holds a reflective mirror d adjacent to the light-emitting device b. The reflective mirror d has a reflective surface e.

The mounting plate a holds a photodetector f on the other side of the reflective mirror d from the light-emitting device b.

The mounting plate a is equipped with a compound lens g covering the light-emitting device b, the reflective mirror d, and the photodetector f. The compound lens g is made of a transparent resin such as polymethyl methacrylate (PMMA).

A transform lens section h and a diffractive section i are separately formed on the top surface of the compound lens g. The transform lens section h is positioned above the reflective surface e of the reflective mirror d; the diffractive section i is positioned above the photodetector f.

A diffractive element j and a focal length adjusting lens section k are separately formed on the bottom surface of the compound lens g. The diffractive element j is positioned below the transform lens section h; the focal length adjusting lens section k is positioned below the diffractive section i.

A beam splitter l is disposed on the other side of the compound lens g from the mounting plate a. The beam splitter l has a splitting surface m.

A reflective prism n is disposed adjacent to the beam splitter l.

A collimator lens o, a waveplate p, and an objective lens q, in that order, are disposed on the other side of the beam splitter l from the compound lens g.

The light-emitting device b emits linearly polarized laser light, which is then reflected by the reflective surface e of the reflective mirror d to be incident on the compound lens g.

The diffractive element j diffracts this laser light incident on the compound lens g into three light beams. The transform lens section h of the compound lens g changes the divergence angle of the diffracted laser light. This process is referred to as numerical aperture (NA) transformation. The resultant laser light is then incident on the beam splitter l.

The laser light incident on the beam splitter l passes through the splitting surface m to be incident on the collimator lens o.

The laser light incident on the collimator lens o is collimated to be incident on the waveplate p, which circularly polarizes the laser light.

The laser light circularly polarized by the waveplate p is incident on the objective lens q, which focuses the laser light on a recording surface of a disc recording medium r.

The recording surface of the disc recording medium r reflects the laser light focused thereon. The reflected laser light then returns through the objective lens q to be incident on the waveplate p, which linearly polarizes the laser light again.

The linearly polarized laser light passes through the collimator lens o to be incident on the beam splitter l. The splitting surface m of the beam splitter l bends the optical path of the laser light 90° to guide the laser light to the reflective prism n.

The optical path of the laser light guided to the reflective prism n is bent 90° by the reflective prism n to be incident on the compound lens g.

The diffractive section i diffracts the laser light incident on the compound lens g into three light beams. The focal length adjusting lens section k adjusts the focal length of the laser light.

The laser light then exits from the compound lens g to be incident on the photodetector f, which performs photoelectric conversion on the laser light. The laser light is output as electrical signals, which, for example, are played back as information signals on the disc recording medium r. The three light beams diffracted by the diffractive element j are used for detecting tracking error signals, while those diffracted by the diffractive section i are used for detecting focusing error signals.

The above compound lens g is a single component that integrates several functions for the laser light. The single component, which has a complicated shape, can readily be made of a resin body. Therefore, the compound lens g can reduce the number of components and production cost of a disc drive.

A compound lens g made of resin unfortunately exhibits changes in its characteristics attributed to changes in its volume and refractive index by variations in temperature and humidity. In particular, aberrations result from such changes in the characteristics during the outward journey of the laser light from the light-emitting device b to the disc recording medium r. These aberrations deteriorate the information signals provided from the disc recording medium r.

For example, a compound lens g made of PMMA in a dry state or in a water-saturated state exhibits changes of up to 0.05% in refractive index and up to 0.04% in thickness. This change in thickness results in a change of up to 0.35% in the optical distance between the light-emitting device b and the objective lens q. For example, a compound lens g with a thickness of 2 mm along the optical axis exhibits a change of up to 7 μm in the optical distance.

Accordingly, an object of the present invention is to provide an optical pickup and a disc drive that solve the above problem, that is, that prevent aberrations of laser light attributed to variations in temperature and humidity, to ensure satisfactory characteristics of the laser light.

DISCLOSURE OF INVENTION

To achieve the above object, an optical pickup and a disc drive according to the present invention include a light-emitting device for emitting laser light, an objective lens for focusing the laser light emitted by the light-emitting device on a recording surface of a disc recording medium, a beam splitter for letting in the laser light emitted by the light-emitting device to guide the laser light to the objective lens, and for changing the optical path of the laser light reflected by the disc recording medium and guided through the objective lens, a photodetector for detecting the laser light the optical path of which was changed by the beam splitter; a compound lens disposed in the optical path of the laser light, which is emitted by the light-emitting device to be incident on the beam splitter, and in the optical path changed by the beam splitter of the laser light, which is incident on the photodetector, and a passage hole in the compound lens for letting in the laser light emitted by the light-emitting device to be incident on the beam splitter. The compound lens has a diffractive section for diffracting the laser light and a lens section having a predetermined function for the laser light. The compound lens is formed by integrating individual sections including the diffractive section and the lens section.

Therefore, in the optical pickup and the disc drive according to the present invention, the laser light emitted by the light-emitting device toward the beam splitter does not pass through a resin part.

To achieve the above object, another optical pickup and disc drive according to the present invention include a light-emitting device for emitting laser light, an objective lens for focusing the laser light emitted by the light-emitting device on a recording surface of a disc recording medium, a beam splitter for letting in the laser light emitted by the light-emitting device to guide the laser light to the objective lens, and for changing the optical path of the laser light reflected by the disc recording medium and guided through the objective lens, a photodetector for detecting the laser light the optical path of which was changed by the beam splitter, a compound lens disposed in the optical path of the laser light, which is emitted by the light-emitting device to be incident on the beam splitter, and the optical path changed by the beam splitter of the laser light, which is incident on the photodetector, and a transparent section on the compound lens for letting in the laser light emitted by the light-emitting device to be incident on the beam splitter. The compound lens has a diffractive section for diffracting the laser light and a lens section having a predetermined function for the laser light. The compound lens is formed by integrating individual sections including the diffractive section and the lens section. The transparent section is thinner along the optical axis than the rest of the compound lens.

Therefore, in the optical pickup and the disc drive according to the present invention, the laser light emitted by the light-emitting device toward the beam splitter passes through a thin resin part.

BRIEF DESCRIPTION OF THE DRAWINGS

FIG. 1 is a schematic perspective view of a disc drive.

FIG. 2 is a schematic diagram showing optical components in the disc drive.

FIG. 3 is a schematic diagram showing optical components in a disc drive according to a modification of the first embodiment.

FIG. 4 is a schematic diagram showing optical components in a disc drive according to another modification of the first embodiment.

BEST MODE FOR CARRYING OUT THE INVENTION

Optical pickups and disc drives of embodiments according to the present invention will now be described with reference to the attached drawings.

A first embodiment will be described (see FIGS. 1 and 2).

Figure 1:
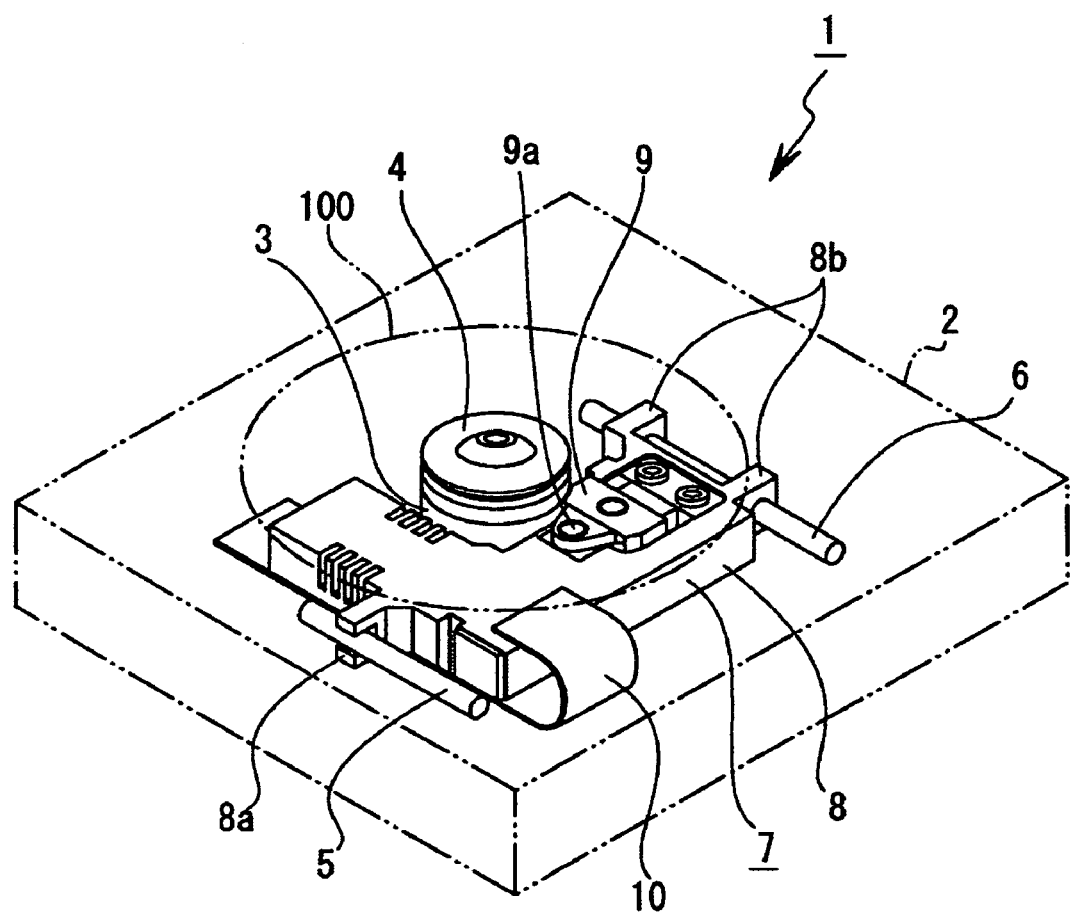
FIGS. 1 to 4 show a first embodiment of the present invention.

A disc drive 1 has a casing 2 including required members and mechanisms (see FIG. 1). The casing 2 has a horizontally extending disc slot, which is not shown in the drawing.

The casing 2 also includes a chassis, not shown in the drawing, holding a spindle motor 3. The motor axis of the spindle motor 3 holds a disc table 4.

The chassis further holds parallel guide axes 5 and 6 and supports a lead screw that is rotated by a feed motor, although the lead screw and the feed motor are not shown in the drawing.

An optical pickup 7 has a movable base 8, required optical components (optical elements and parts) on the movable base 8, and a two-axis actuator 9 supported on the movable base 8. The guide axes 5 and 6 support bearings 8a and 8b on both sides of the movable base 8. The bearings 8a and 8b can be slid freely on the guide axes 5 and 6. The lead screw is screwed into a nut, not shown in the drawing, on the movable base 8. When the feed motor rotates the lead screw, the nut shifts in a direction according to the rotation of the lead screw to move the optical pickup 7 in the radial direction of a disc recording medium 100 loaded on the disc table 4.

The movable base 8 connects to one end of a flexible printed circuit board 10. The other end of the flexible printed circuit board 10 connects to a drive control circuit board, not shown in the drawing, in the casing 2. Through the flexible printed circuit board 10, for example, the two-axis actuator 9 and the optical components in the optical pickup 7 are supplied with power or send and receive various signals.

Figure 2:
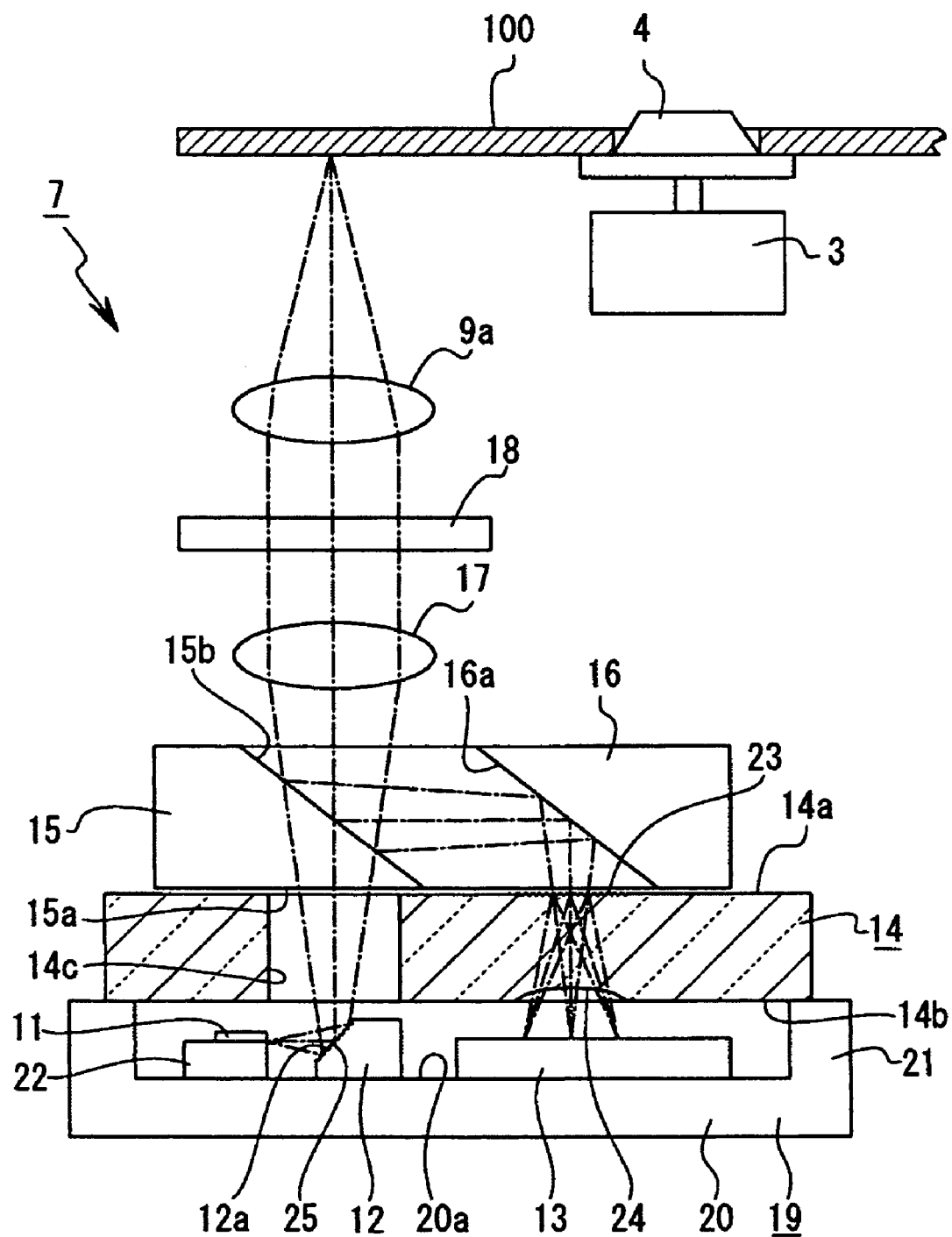

The movable base 8 holds the required optical components (see FIG. 2).

Examples of the optical components include a light-emitting device 11, a reflective mirror 12, a photodetector 13, a compound lens 14, a beam splitter 15, a reflective prism 16, a collimator lens 17, a waveplate 18, and an objective lens 9a of the two-axis actuator 9. Each component is disposed at a predetermined position.

A mounting plate 19 holds the light-emitting device 11, the reflective mirror 12, and the photodetector 13. The mounting plate 19, which is a thin box having a top opening, is composed of a flat holder 20 and sidewalls 21 around the edges of the holder 20. The inner surface of the holder 20 is a mounting surface 20a, which holds a metal lead frame that is not shown in the drawing.

A mounting block 22, referred to as a submount, separates the light-emitting device 11 and the mounting surface 20a of the mounting plate 19. An example of the light-emitting device 11 is an edge-emitting laser diode, which emits laser light in the lateral direction. A purpose of the mounting block 22 is to dispose the light-emitting device 11 apart from the mounting surface 20a. The mounting block 22 prevents the mounting surface 20a from reflecting laser light emitted by the light-emitting device 11 from causing a noise.

The mounting plate 19 holds the reflective mirror 12 and the photodetector 13, as well as the light-emitting device 11, on the mounting surface 20a. The photodetector 13 is disposed on the other side of the reflective mirror 12 from the light-emitting device 11.

The reflective mirror 12 has an inclined surface, which is a reflective surface 12a. This reflective surface 12a, for example, is formed by coating the inclined surface with a reflective film and is inclined at an angle of 45° to the optical path of the laser light emitted by the light-emitting device 11.

The compound lens 14 is made of a transparent resin such as polymethyl methacrylate (PMMA), is rectangular, and integrates individual sections. The compound lens 14 is disposed on the top surface of the sidewalls 21 of the mounting plate 19 and covers the light-emitting device 11, the reflective mirror 12, and the photodetector 13.

The compound lens 14 has a diffractive section 23, which is composed of, for example, a diffraction grating, on a top surface 14a above the photodetector 13. The compound lens 14 has a focal length adjusting lens section 24 on a bottom surface 14b below the diffractive section 23.

The compound lens 14 has a vertical passage hole 14c above the reflective surface 12a of the reflective mirror 12.

The beam splitter 15 is disposed on the other side of the compound lens 14 from the mounting plate 19 and is fixed on the compound lens 14 such that a bottom surface 15a of the beam splitter 15 faces the top surface 14a of the compound lens 14. The beam splitter 15 has a splitting surface 15b above the passage hole 14c of the compound lens 14.

The reflective prism 16 is disposed adjacent to the beam splitter 15 on the compound lens 14. This reflective prism 16 has a reflective surface 16a.

The collimator lens 17, the waveplate 18, and the objective lens 9a of the two-axis actuator 9 are disposed on the other side of the beam splitter 15 from the compound lens 14.

The above reflective mirror 12 has a diffractive element 25 composed of, for example, a diffraction grating on the reflective surface 12a.

The reflective surface 12a of the reflective mirror 12 reflects linearly polarized laser light emitted by the light-emitting device 11 to guide the laser light to the compound lens 14. In this time, the diffractive element 25 on the reflective surface 12a of the reflective mirror 12 diffracts the laser light into three light beams.

The diffracted laser light passes through the passage hole 14c of the compound lens 14 to be incident on the beam splitter 15. The laser light incident on the beam splitter 15 passes through the splitting surface 15b to be incident on the collimator lens 17.

The laser light incident on the collimator lens 17 is collimated to be incident on the waveplate 18, which circularly polarizes the laser light.

The laser light circularly polarized by the waveplate 18 is incident on the objective lens 9a, which focuses the laser light on a recording surface of the disc recording medium 100.

The recording surface of the disc recording medium 100 reflects the laser light focused thereon. The reflected laser light then returns through the objective lens 9a to be incident on the waveplate 18, which linearly polarizes the laser light again.

The linearly polarized laser light passes through the collimator lens 17 to be incident on the beam splitter 15. The splitting surface 15b of the beam splitter 15 bends the optical path of the laser light 90° to guide the laser light to the reflective prism 16.

The optical path of the laser light guided to the reflective prism 16 is bent 90° by the reflective surface 16a to be incident on the compound lens 14.

The diffractive section 23 diffracts the laser light incident on the compound lens 14 into three light beams. The focal length adjusting lens section 24 adjusts the focal length of the laser light.

The laser light then exits from the compound lens 14 to be incident on the photodetector 13, which performs photoelectric conversion on the laser light. The laser light is output as electrical signals, which, for example, are played back as information signals on the disc recording medium 100. The three light beams diffracted by the diffractive element 25 are used for detecting tracking error signals, while those diffracted by the diffractive section 23 are used for detecting focusing error signals.

The laser light emitted by the light-emitting device 11 generally undergoes NA transformation to change the divergence angle. The optical pickup 7, however, does not have a transform lens section for NA transformation; the optical pickup 7 achieves this by changing the focal length of the objective 9a and the position of the photodetector 13.

As described above, the disc drive 1 includes the passage hole 14c, which lets in the laser light. The laser light, emitted by the light-emitting device 11 toward the disc recording medium 100, causes significantly less aberrations attributed to variations in temperature and humidity. Therefore, the disc drive 1 prevents the deterioration of information signals provided from the disc recording medium 100.

The passage hole 14c of the compound lens 14 has an aperture area smaller than the area of the bottom surface 15a of the beam splitter 15. Therefore, the beam splitter 15 can be successfully fixed on the top surface 14a of the compound lens 14, even though the compound lens 14 has the passage hole 14c.

In addition, the diffractive element 25 on the reflective mirror 12 eliminates dedicated optical components for forming the diffractive element 25. This suppresses increases in the number of components and production cost.

Figure 3:
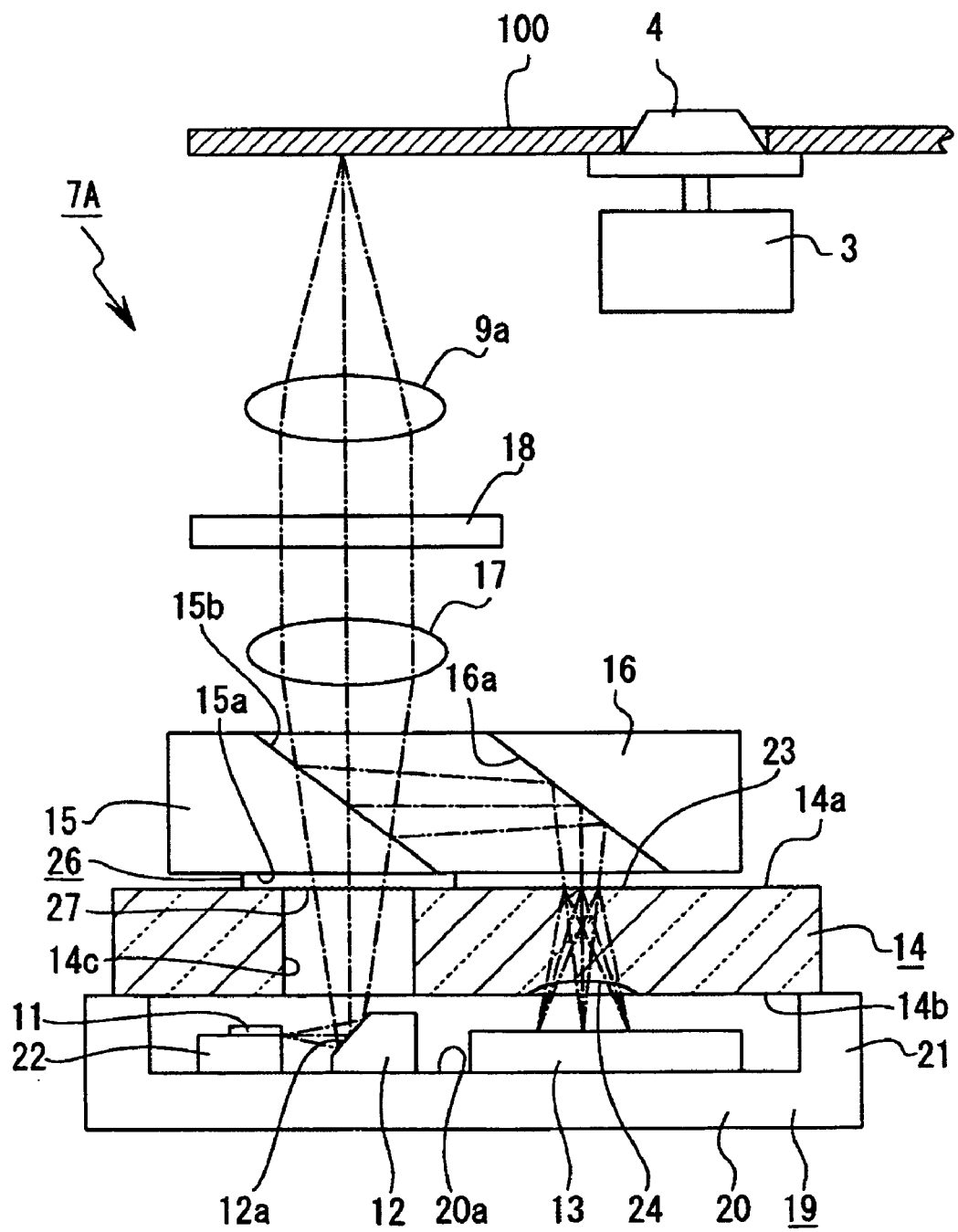

Next, a modification of the first embodiment will now be described (see FIG. 3).

An optical pickup 7A of this modification is different from the above optical pickup 7 only in that the optical pickup 7A has a diffractive member with a diffractive element instead of a diffractive element on a reflective mirror or a beam splitter. Thus, only the different part will be described in detail; the other parts will not be described and are represented by the same reference numerals as the corresponding parts of the optical pickup 7.

In the optical pickup 7A, a diffractive member 26 is disposed on the top surface 14a of the compound lens 14 such that the diffractive member 26 closes the passage hole 14c. This diffractive member 26 is, for example, flat, transparent glass, which has a diffractive element 27 on its top or bottom surface.

The beam splitter 15 is disposed on the diffractive member 26.

The reflective surface 12a of the reflective mirror 12 reflects linearly polarized laser light emitted by the light-emitting device 11 to guide the laser light to the compound lens 14. The laser light passes through the passage hole 14c in the compound lens 14 to be incident on the diffractive member 26.

The diffractive element 27 diffracts the laser light incident on the diffractive member 26 into three light beams. The laser light is then incident on the beam splitter 15.

As described above, also in the optical pickup 7A, the compound lens 14 has the passage hole 14c, which lets in the laser light. The laser light, emitted by the light-emitting device 11 toward the disc recording medium 100, causes significantly less aberrations attributed to variations in temperature and humidity. Therefore, the optical pickup 7A prevents the deterioration of information signals provided from the disc recording medium 100.

In addition, the diffractive member 26 ensures satisfactory optical characteristics of the laser light.

Figure 4:
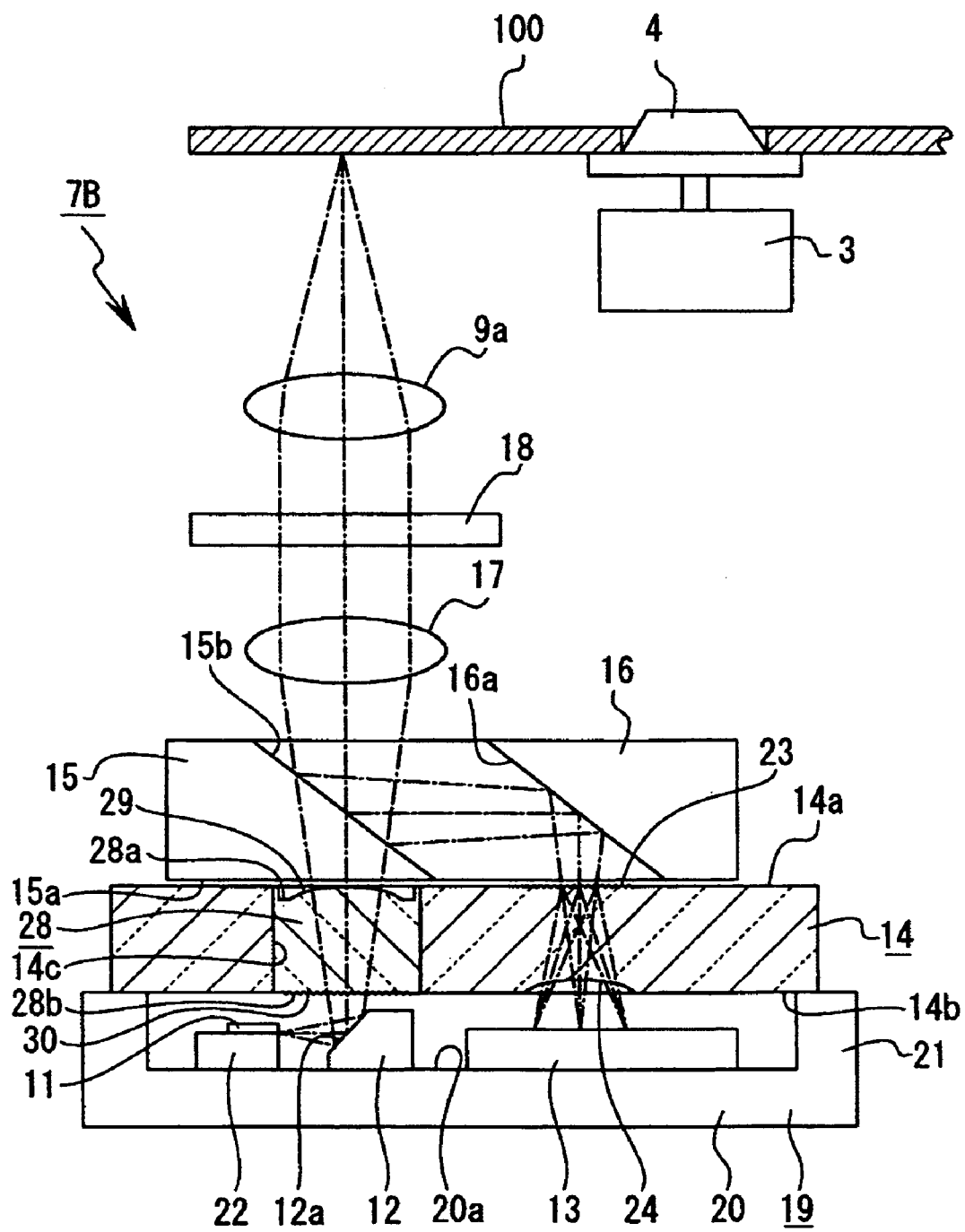

Next, another modification of the first embodiment will be described (see FIG. 4).

An optical pickup 7B of this modification is different from the above optical pickup 7 only in that the optical pickup 7B has a transparent member with a diffractive element instead of a diffractive element on a reflective mirror or a beam splitter. Thus, only the different part will be described in detail; the other parts will not be described and are represented by the same reference numerals as the corresponding parts of the optical pickup 7.

In the optical pickup 7B, the passage hole 14c in the compound lens 14 holds a transparent member 28. This transparent member 28 is made of transparent glass and has substantially the same thickness as the compound lens 14 along the optical axis. The transparent member 28 has a transform lens section 29 on its top surface 28a and a diffractive element 30 on its bottom surface 28b.

Linearly polarized laser light emitted by the light-emitting device 11 is reflected by the reflective surface 12a of the reflective mirror 12 to be incident on the transparent member 28.

The diffractive element 30 diffracts the laser light incident on the transparent member 28 into three light beams. The transform lens section 29 performs NA transformation on the diffracted laser light to change the divergence angle. The resultant laser light is then incident on the beam splitter 15.

As described above, in the optical pickup 7B, the laser light the optical path of which is bent by the reflective mirror 12 passes through the glass transparent member 28. The laser light, emitted by the light-emitting device 11 toward the disc recording medium 100, causes significantly less aberrations attributed to variations in temperature and humidity. Therefore, the optical pickup 7B prevents the deterioration of information signals provided from the disc recording medium 100.

In addition, in the optical pickup 7B, the passage hole 14c in the compound lens 14 holds the transparent member 28. This allows the miniaturization of the optical pickup 7B.

Furthermore, the transparent member 28 having the diffractive element 30 eliminates dedicated optical components for forming the diffractive element 30. This suppresses increases in the number of components and production cost.

Figure 5:
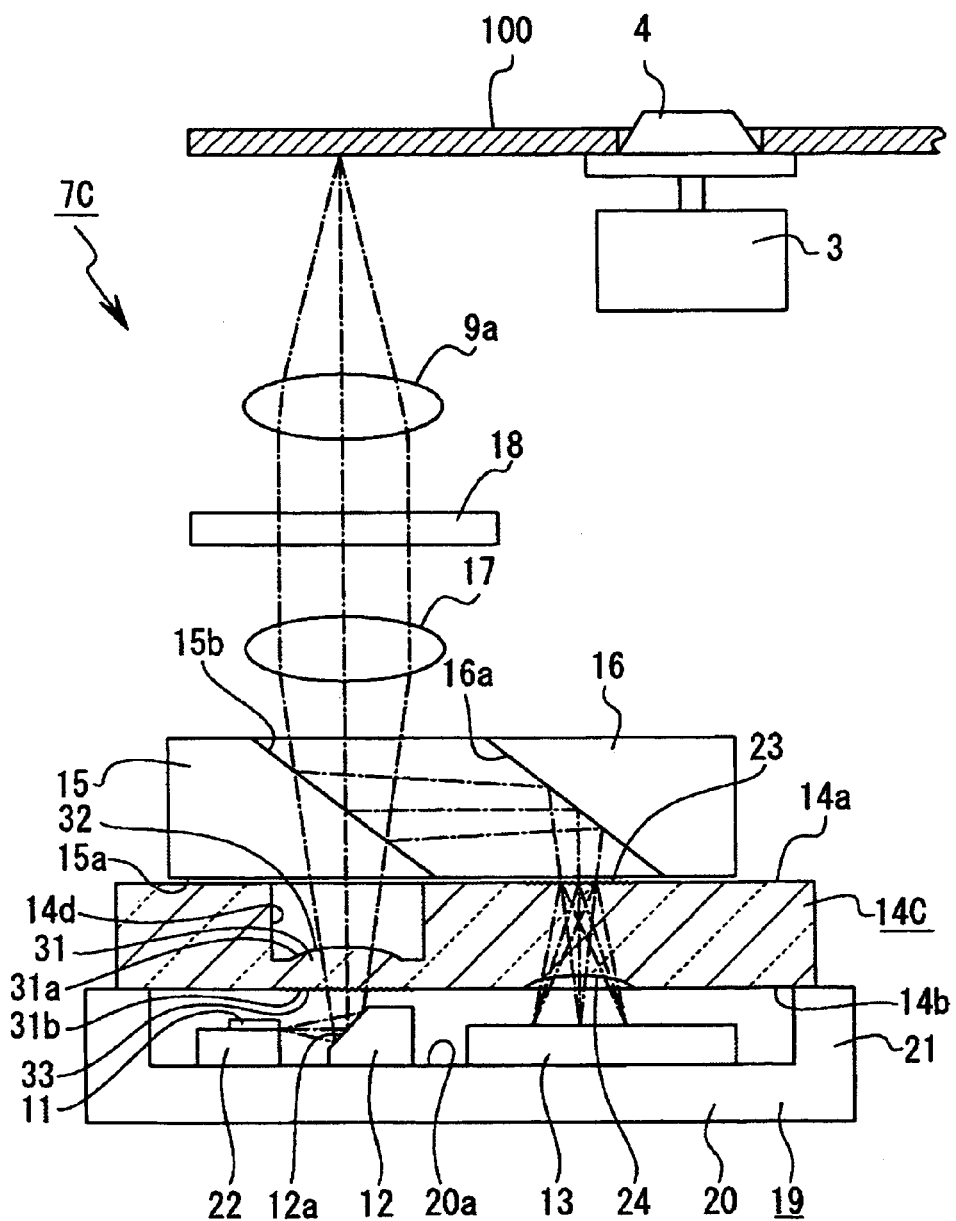
FIG. 5 is a schematic diagram showing optical components in a disc drive according to a second embodiment.
Figure 6:
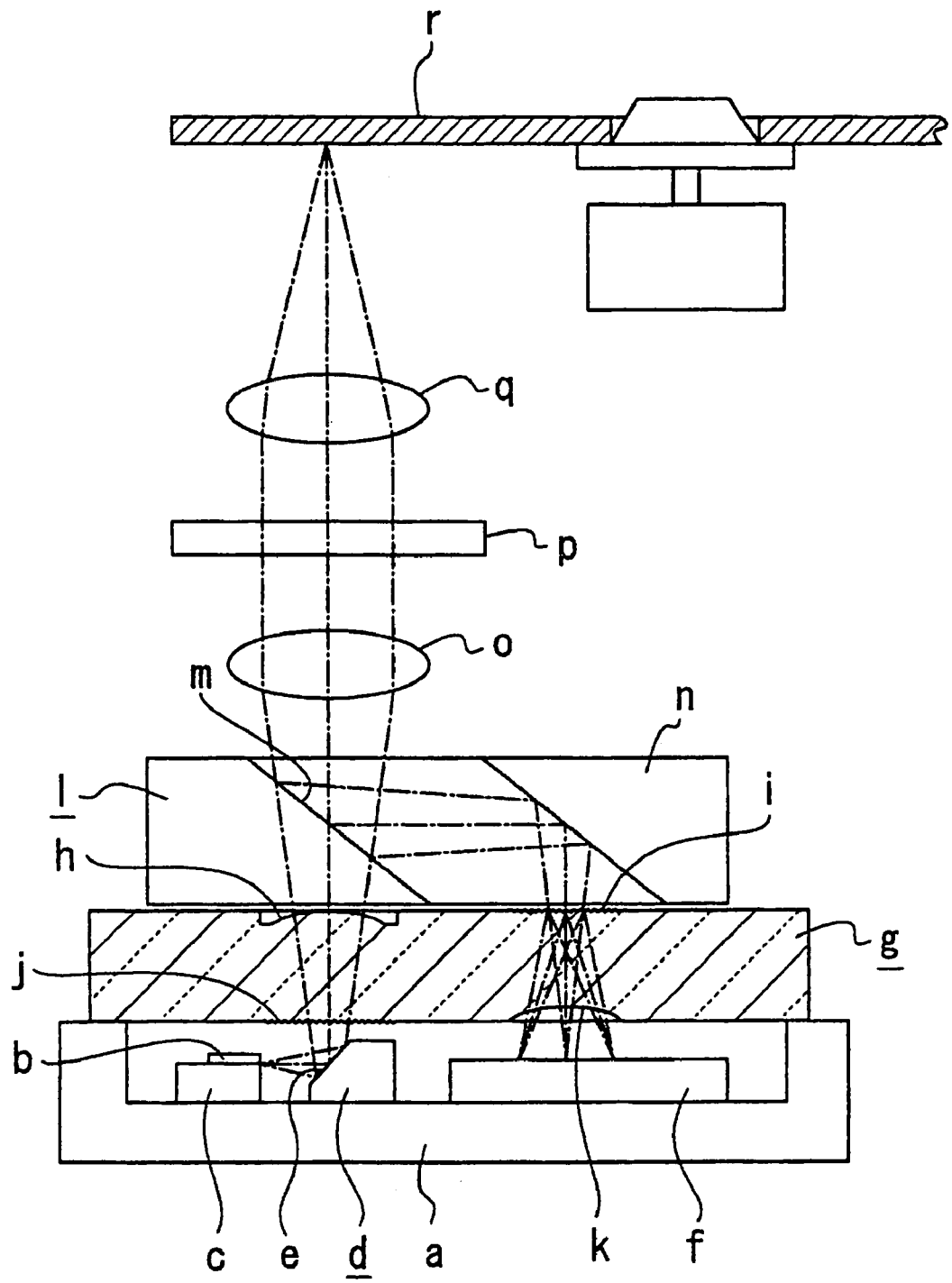
FIG. 6 is a schematic diagram showing optical components in a conventional disc drive.

Next, a second embodiment will be described (see FIG. 5).

An optical pickup 7C of the second embodiment is different from the above optical pickup 7 only in that the compound lens integrates a transparent section in the optical path (the outward journey) of laser light instead of a passage hole. Thus, only the different part will be described in detail; the other parts will not be described and are represented by the same reference numerals as the corresponding parts of the optical pickup 7.

In the optical pickup 7C, a compound lens 14C is made of a transparent resin, such as polymethyl methacrylate (PMMA), is rectangular, and integrates individual sections. The mounting plate 19 holds the compound lens 14C on the top surface of the sidewalls 21. The compound lens 14C covers the light-emitting device 11, the reflective mirror 12, and the photodetector 13.

The compound lens 14C, as well as the compound lens 14, have the diffractive section 23 and the focal length adjusting lens section 24.

The compound lens 14C has a passage recess section 14d on its top side above the reflective surface 12a of the reflective mirror 12. A transparent section 31 under the passage recess section 14d on the compound lens 14 is integrated with the rest of the compound lens 14C.

The transparent section 31 is thinner, along the optical axis, than the rest of the compound lens 14C. The transparent section 31 has a transform lens section 32 on its top surface 31a and a diffractive element 33 on its bottom surface 31b.

Linearly polarized laser light emitted by the light-emitting device 11 is reflected by the reflective surface 12a of the reflective mirror 12 to be incident on the transparent section 31 of the compound lens 14C.

The diffractive element 33 diffracts the laser light incident on the transparent section 31 into three light beams. The transform lens section 32 performs NA transformation on the diffracted laser light to change the divergence angle. The resultant laser light is then incident on the beam splitter 15.

As described above, in the optical pickup 7C, the laser light the optical path of which is bent by the reflective mirror 12 passes through the transparent section 31 thin along the optical axis. The laser light, emitted by the light-emitting device 11 toward the disc recording medium 100, causes significantly less aberrations attributed to variations in temperature and humidity. Therefore, the optical pickup 7C prevents the deterioration of information signals provided from the disc recording medium 100.

A compound lens having a small total thickness along the optical axis tends to cause birefringence due to the flow of resin during molding. In the compound lens 14C of the optical pickup 7C, only the transparent section 31 is thin along the optical axis. This prevents birefringence and aberrations of the laser light.

Furthermore, in the compound lens 14C, the transparent section 31 having the diffractive element 33 eliminates dedicated optical components for forming the diffractive element 33. This suppresses increases in the number of components and production cost.

The above embodiment uses an edge-emitting device as the light-emitting device 11; however, it may be a surface-emitting device, which emits laser light upward. This eliminates the reflective mirror.

In the above optical pickup 7, 7A, 7B, or 7C, the laser light on the return journey, namely, the optical path of the laser light back from the disc recording medium 100, passes through the compound lens 14 or 14C made of resin, thus readily causing aberrations of the laser light on the return journey. However, the laser light incident on the photodetector 13 has no need to be focused. Therefore, these aberrations do not cause deterioration of information signals provided from the disc recording medium 100.

The specific shapes and structures of each part shown in the above embodiments are merely examples of embodiments according to the present invention and, therefore, do not limit the technical scope of the present invention.

INDUSTRIAL APPLICABILITY

In an optical pickup of the present invention, laser light emitted by a light-emitting device toward a beam splitter does not pass through a resin part. Therefore, the laser light, emitted by the light-emitting device toward a disc recording medium, causes significantly less aberrations attributed to variations in temperature and humidity. This prevents the deterioration of information signals provided from the disc recording medium.

In addition, the optical pickup eliminates dedicated optical components for forming a diffractive element, thereby suppressing increases in the number of components and production cost. Moreover, the optical pickup ensures satisfactory optical characteristics of the laser light. Furthermore, a passage hole in a compound lens holds a glass transparent member that lets in the laser light, allowing the miniaturization of the optical pickup.

In another optical pickup of the present invention, laser light emitted by a light-emitting device toward a beam splitter passes through a thin resin part. Therefore, the laser light, emitted by the light-emitting device toward a disc recording medium, causes significantly less aberrations attributed to variations in temperature and humidity. This prevents the deterioration of information signals provided from the disc recording medium. In addition, the optical pickup eliminates dedicated optical components for forming a diffractive element. This suppresses increases in the number of components and production cost.

In a disc drive of the present invention, laser light emitted by a light-emitting device toward a beam splitter does not pass through a resin part. Therefore, the laser light, emitted by the light-emitting device toward a disc recording medium, causes significantly less aberrations attributed to variations in temperature and humidity. This prevents the deterioration of information signals provided from the disc recording medium.

In addition, the disc drive eliminates dedicated optical components for forming a diffractive element, thereby suppressing increases in the number of components and production cost. Moreover, the disc drive ensures satisfactory optical characteristics of the laser light.

Furthermore, a passage hole in the compound lens holds a glass transparent member that lets in the laser light, allowing the miniaturization of the disc drive.

In another disc drive of the present invention, laser light emitted by a light-emitting device toward a beam splitter passes through a thin resin part. Therefore, the laser light, emitted by the light-emitting device toward a disc recording medium, causes significantly less aberrations attributed to variations in temperature and humidity. This prevents the deterioration of information signals provided from the disc recording medium. In addition, the disc drive eliminates dedicated optical components for forming a diffractive element. This suppresses increases in the number of components and production cost.

The invention claimed is:

1. An optical pickup, comprising:
a container having a base and a sidewall surrounding the base to form a container space;
a light-emitting device for emitting laser light disposed in the container space;
a photodetector disposed in the container space;
a reflective mirror disposed in the container space and between the light-emitting device and the photodetector, the reflective mirror having a reflective mirror surface angled at 45° for reflecting the laser light emitted by the light-emitting device outwardly of the container;
a compound lens having opposing compound lens surfaces, a first light-receiving compound lens section and a second light-receiving compound lens section;
a beam splitter having a beam splitting surface and a reflective beam splitter surface;
a collimator lens;
a wave plate; and
an objective lens,
wherein laser light from the light-emitting device is reflected by the reflective surface of the reflective mirror and is transmitted through the first light-receiving compound lens section and into the beam splitter where the beam splitting surface splits the laser beam for transmission serially through the collimator lens, the wave plate and the objective lens and for reflection from the reflective beam splitter surface and serially through the second light-receiving compound lens section and onto the photodetector,
wherein the second light-receiving compound lens section has a diffractive grating formed on one compound lens surface adjacent the beam splitter and a lens section formed on a remaining compound lens surface adjacent the container, and
wherein the reflective mirror surface is formed with a diffractive grating thereon and the first light-receiving compound lens section is a passage hole formed into and through the compound lens.

2. An optical pickup, comprising:
a container having a base and a sidewall surrounding the base to form a container space;
a light-emitting device for emitting laser light disposed in the container space;
a photodetector disposed in the container space;
a reflective mirror disposed in the container space and between the light-emitting device and the photodetector, the reflective mirror having a reflective mirror surface angled at 45° for reflecting the laser light emitted by the light-emitting device outwardly of the container;
a compound lens having opposing compound lens surfaces, a first light-receiving compound lens section and a second light-receiving compound lens section;
a beam splitter having a beam splitting surface and a reflective beam splitter surface;
a collimator lens;
a wave plate; and
an objective lens,
wherein laser light from the light-emitting device is reflected by the reflective surface of the reflective mirror and is transmitted through the first light-receiving compound lens section and into the beam splitter where the beam splitting surface splits the laser beam for transmission serially through the collimator lens, the wave plate and the objective lens and for reflection from the reflective beam splitter surface and serially through the second light-receiving compound lens section and onto the photodetector, wherein the second light-receiving compound lens section has a diffractive grating formed on one compound lens surface adjacent the beam splitter and a lens section formed on a remaining compound lens surface adjacent the container, and wherein the first light-receiving compound lens section includes a diffractive grating formed on one compound lens surface adjacent the beam splitter and a passage hole formed into the remaining compound lens surface adjacent the container.

3. An optical pickup, comprising:

a container having a base and a sidewall surrounding the base to form a container space;

a light-emitting device for emitting laser light disposed in the container space;

a photodetector disposed in the container space;

a reflective mirror disposed in the container space and between the light-emitting device and the photodetector, the reflective mirror having a reflective mirror surface angled at 45° for reflecting the laser light emitted by the light-emitting device outwardly of the container;

a compound lens having opposing compound lens surfaces, a first light-receiving compound lens section and a second light-receiving compound lens section;

a beam splitter having a beam splitting surface and a reflective beam splitter surface;

a collimator lens;

a wave plate; and an objective lens, wherein laser light from the light-emitting device is reflected by the reflective surface of the reflective mirror and is transmitted through the first light-receiving compound lens section and into the beam splitter where the beam splitting surface splits the laser beam for transmission serially through the collimator lens, the wave plate and the objective lens and for reflection from the reflective beam splitter surface and serially through the second light-receiving compound lens section and onto the photodetector, wherein the second light-receiving compound lens section has a diffractive grating formed on one compound lens surface adjacent the beam splitter and a lens section formed on a remaining compound lens surface adjacent the container, and wherein the first light-receiving compound lens section has a passage hole formed into and through the compound lens and a transparent member disposed in the passage hole in a close-fitting relationship, the transparent member has a transform lens section adjacent the beam splitter and a diffractive grating adjacent the container.

4. An optical pickup, comprising:

a container having a base and a sidewall surrounding the base to form a container space;

a light-emitting device for emitting laser light disposed in the container space;

a photodetector disposed in the container space;

a reflective mirror disposed in the container space and between the light-emitting device and the photodetector, the reflective mirror having a reflective mirror surface angled at 45° for reflecting the laser light emitted by the light-emitting device outwardly of the container;

a compound lens having opposing compound lens surfaces, a first light-receiving compound lens section and a second light-receiving compound lens section;

a beam splitter having a beam splitting surface and a reflective beam splitter surface;

a collimator lens;

a wave plate; and an objective lens, wherein laser light from the light-emitting device is reflected by the reflective surface of the reflective mirror and is transmitted through the first light-receiving compound lens section and into the beam splitter where the beam splitting surface splits the laser beam for transmission serially through the collimator lens, the wave plate and the objective lens and for reflection from the reflective beam splitter surface and serially through the second light-receiving compound lens section and onto the photodetector, wherein the second light-receiving compound lens section has a diffractive grating formed on one compound lens surface adjacent the beam splitter and a lens section formed on a remaining compound lens surface adjacent the container, and wherein the first light-receiving compound lens section has a passage recess formed into one compound lens surface adjacent the beam splitter and a transparent member disposed in the passage recess, the transparent member has a transform lens section disposed in the passage recess and a diffractive grating formed on an outer transparent member surface adjacent the container and substantially coexistent with the remaining compound lens surface.

* * * * *